United States Patent [19]

Hedler et al.

[11] Patent Number: 4,608,709
[45] Date of Patent: Aug. 26, 1986

[54] METHOD AND APPARATUS FOR GAUGING CONTAINERS

[75] Inventors: Robert C. Hedler, Toledo, Ohio; Robert D. Kohler, Temperance, Mich.; John H. Dunlap, Wickliffe, Ohio

[73] Assignee: Owens-Illinois, Inc., Toledo, Ohio

[21] Appl. No.: 773,087

[22] Filed: Sep. 4, 1985

Related U.S. Application Data

[63] Continuation of Ser. No. 473,285, Mar. 8, 1983, abandoned.

[51] Int. Cl.⁴ ............................................. G06K 9/00
[52] U.S. Cl. ...................................... 382/1; 382/25; 250/223 B
[58] Field of Search .................... 382/1, 25; 250/223 B

[56] References Cited

U.S. PATENT DOCUMENTS

| | | | |
|---|---|---|---|
| 3,549,890 | 1/1969 | Keller | 250/209 |
| 3,955,179 | 5/1976 | Planke | 340/146.3 H |
| 4,055,834 | 9/1977 | Planke | 340/146.3 F |
| 4,064,534 | 12/1977 | Chen et al. | 358/107 |
| 4,170,417 | 9/1979 | Tourres | 356/385 |
| 4,467,350 | 8/1984 | Miller | 358/106 |
| 4,492,476 | 1/1985 | Miyazawa | 250/223 B |
| 4,494,656 | 1/1985 | Shay et al. | 250/223 B |
| 4,500,203 | 2/1985 | Bieringer | 250/223 B |

Primary Examiner—Leo H. Boudreau
Assistant Examiner—Jacqueline Todd
Attorney, Agent, or Firm—John R. Nelson

[57] ABSTRACT

A method and apparatus for measuring the outer diameters, ovality and eccentricity of the finish of a container is disclosed. The invention can be practiced in either a one-camera or a two-camera embodiment. The one-camera embodiment comprises means for illuminating the finish with a collimated beam of light to produce a transmitted beam containing a shadow of the finish and means for focusing the transmitted beam containing the shadow of the finish to produce the image thereof. The apparatus further comprises a line-scan camera for periodically scanning sequential segments of the image from one periphery to the other periphery as the container rotates for providing a plurality of pixel signals for each scan, and a data circuit responsive to the magnitudes of the pixel signals in each of the scans for counting the number of signals in the peripheries of the image to provide a left periphery count and a right periphery count for each scan. The apparatus further comprises a computer responsive to the periphery counts for calculating the outer diameter of the finish and for providing a reject signal if the outer diameter is not between a predetermined maximum and minimum value.

28 Claims, 12 Drawing Figures

FIG. 7 LIP DATA CIRCUIT

MAIN PROGRAM
121

IRQ INTERRUPT
141

METHOD AND APPARATUS FOR GAUGING CONTAINERS

This is a continuation of co-pending application Ser. No. 473,285 filed on Mar. 8, 1983, now abandoned.

FIELD OF THE INVENTION

The present invention relates in general to the gauging of a container and, more particularly, to a method and apparatus for measuring the outer diameters, ovality and eccentricity of the finish of the container.

BACKGROUND OF THE INVENTION

In the filling, handling and dispensing of hollow containers, it is necessary that the containers be of uniform size and shape in order that high-speed filling and handling machinery can be used. If the outer diameter of the finish of the container is not between a predetermined maximum and minimum value, the closure for capping the container will either not fit over the lip of the finish or will fit over the lip of the finish without fitting snugly thereon. It is, therefore, important to reject containers during manufacture which vary from the predetermined standard size and shape. In the distant past, this has been accomplished primarily by visual inspection. Such an inspection, of course, is subject to human error and, therefore, is not entirely satisfactory.

To eliminate the human error associated with the visual inspection, a cup gauge was developed to reject containers wherein the outer diameter of the lip of the finish is not between a predetermined maximum and minimum value. The cup gauge is a device having a cup with an inner diameter corresponding to the maximum diameter mounted at one end and a cup with an inner diameter corresponding to a minimum diameter mounted on the other end. An inspector uses the cup gauge to test each container by insuring that the cup of maximum diameter fits over each and every container, i.e., a GO test, and that the cup of minimum diameter does not fit over any of the containers, i.e., a NO-GO test. If the cup of maximum diameter does not fit over the container or if the cup of minimum diameter does fit over the container, that container is rejected. Such an inspection, of course, still requires an inspector and actual physical contact with each and every one of the containers.

Automatic gauging equipment is presently available that eliminates the need for an inspector. However, the equipment still accomplishes gauging by contact with the finish which can be chipped as a result of such contact. Devices have been developed to accomplish gauging without physical contact such as, for example, U.S. Pat. No. 3,245,531 granted to B. B. Mathias et al and assigned to the assignee of the present invention. However, such devices required a complex arrangement of optics and mechanisms to provide an analog signal having a temporal profile proportional to the shape of the containers. These analog devices are costly, generally unreliable because of a lack of sufficient resolution, and unable to provide measurements at now-standard high production rates.

SUMMARY OF THE INVENTION

The present invention is directed to a method and apparatus for measuring the diameters, ovality and eccentricity of the finish of a container. Furthermore, the invention can be practiced in either a one-camera or a two-camera embodiment. The one-camera embodiment comprises means for illuminating the finish with a collimated beam of light to produce a transmitted beam containing a shadow of the finish and means for focusing the transmitted beam containing the shadow of the finish to produce an image thereof. The apparatus further comprises a line-scan camera responsive to the focused beam for periodically scanning sequential segments of the image from one periphery to the other periphery as the container rotates for providing a plurality of pixel signals for each scan, and a data circuit responsive to the magnitudes of the pixel signals in each of the scans for counting the number of pixel signals in the peripheries of the image to provide a left periphery count and a right periphery count for each scan. The apparatus further comprises a computer responsive to the periphery counts for calculating the outer diameter of the finish and for providing a reject signal if the largest scan diameter is not between a predetermined maximum and minimum value.

Therefore, the one-camera embodiment automatically accomplishes the task of the cup gauge and does so without contact with the finish unlike the automatic equipment presently available. Furthermore, the instant invention accomplishes gauging by using simple optics and electronic processing unlike the device disclosed in Mathias. Most importantly, the instant invention uses a "linear" scan camera to obtain "two-dimensional" information concerning the finish unlike any equipment presently available. This feature will be described in more detail below. Additional features of the instant invention include the capabilities to measure the smallest scan diameter of the finish, the ovality of the finish and the eccentricity of the finish. It is an object of this invention to provide a method and apparatus for automatically measuring the diametrical characteristics of a container such as, for example, the largest scan diameter of the finish, the smallest scan diameter of the finish, the ovality of the finish, and the eccentricity of the finish with respect to the body of the container with no physical contact so that the container can be rejected if defective.

DETAILED DESCRIPTION OF THE INVENTION

Figure 1:
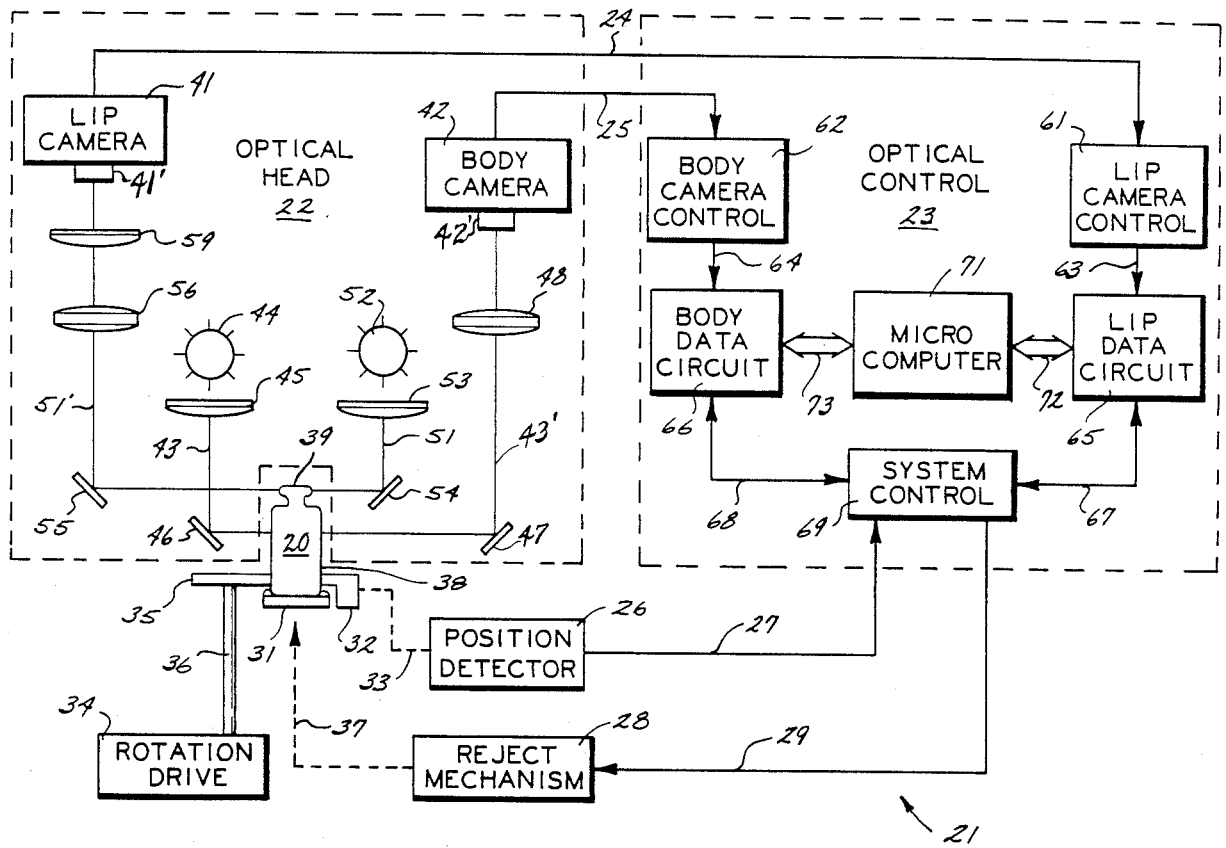
FIG. 1 is a partially schematic, vertical sectional view of a glass container and a two-camera system for inspecting the finish and body of the container according to the invention.

Referring in detail to FIG. 1, a system for inspecting a container 20 is illustrated generally at 21 and comprises an optical head 22 for scanning the container 20, an optical control 23 for receiving data from the optical head 22 along the wires 24 and 25, a position detector 26 electrically connected to the optical control 23 by a wire 27, and a reject mechanism 28 electrically connected to the optical control 23 by a wire 29. The container 20 is transported in a pocket 31. The position detector 26 is connected to an inspection station 32 as indicated by the dashed line 33 and provides a signal to the optical control 23 when the pocket 31, with or without the container 20, arrives at the inspection station 32. A rotational drive 34 associated with the inspection station 32, and well known in the art, turns a wheel 35 via a shaft 36. The wheel 35 rotates the container 20 while being scanned by the optical head 22 at the inspection station 32. The speed of the wheel 35 is set to rotate the container at a rate much slower than the rate at which the optical head 22 scans the container 20. After the optical head 22 has scanned the container, the pocket 31 moves the container 20 from the inspection station 32 to the rejection station (not shown). If the data provided by the optical head 22 indicates that the container 20 is defective, the optical control 23 transmits a signal to the reject mechanism 28 which removes the container 20 from the pocket 31 as indicated by the dashed line 37. Meanwhile, the next container is being scanned by the optical head 22 at the inspection station 32.

The container 20 comprises a body 38 which opens to a finish having a lip 39 at the orifice. The optical head 22 is shown as a two-camera embodiment comprising a lip camera 41 and a body camera 42. Each camera contains a linear array (not shown) of photosensitive diodes, or pixels, and can be, for example, Model CCD1300R available from the Fairchild Camera and Instrument Corporation located in Mountain View, Calif. The body 38 of the container 20 is illuminated by a beam of light 43 generated by a source 44 and collimated by a spherical, plano-convex lens 45. The collimated beam 43 is reflected by a mirror 46 to illuminate a portion of the body that is transverse with respect to the longitudinal axis of the container 20. The transmitted beam 43' is reflected by a mirror 47 to a double-convex lens 48 which focuses the transmitted beam 43' so that its image illuminates all of the pixels along the full length of the linear array of the body camera 42. The linear array of the body camera 42 is appropriately oriented and the lens 42' of the body camera 42 is appropriately focused so that the field-of-view of the camera 42 is a transverse slice of the illuminated portion of the body 38 as shown at 49 in FIG. 4. As already mentioned, the optical head 22 can also be a one-camera embodiment, in which case the head 22 would comprise only the lip camera 41 and the associated optics which will not be described.

Figure 2:
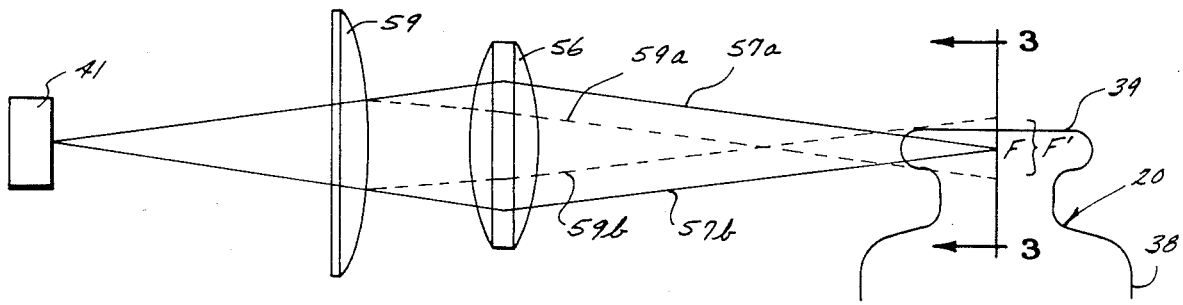
FIG. 2 is a schematic view of the container and the optics of FIG. 1 associated with viewing the finish of the container according to the invention.
Figure 3:
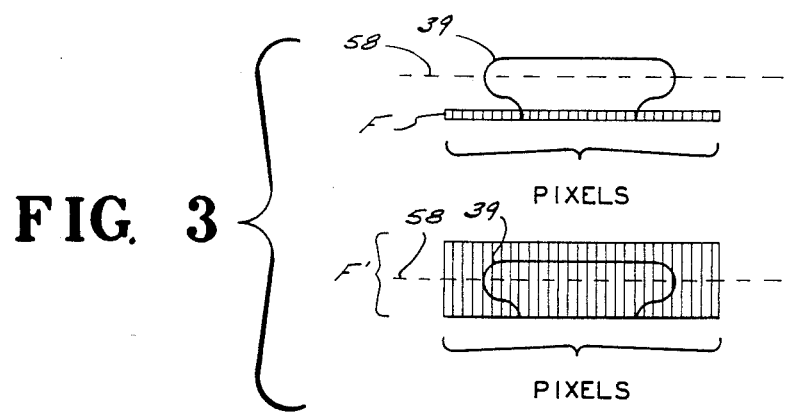
FIG. 3 is a partially schematic, vertical section of the images of FIG. 2 taken along the line 3—3 according to the invention.

The lip 39 of the container 20 is illuminated by a beam of light 51 generated by a source 52 and collimated by a spherical, plano-convex lens 53. The collimated beam 51 is reflected by a mirror 54 to illuminate the entire lip 39 and has a diameter exceeding the maximum diameter and the axial height of the lip 39 to produce a transmitted beam 51' containing a shadow of the lip 39. The transmitted beam 51' is reflected by a mirror 55 to a double-convex lens 56 which focuses the transmitted beam 51' so that its image illuminates all of the pixels along the full length of the linear array of the lip camera 41. The linear array of the lip camera 41 is appropriately oriented and the lens 41' of the lip camera 41 is appropriately focused as illustrated by lines 57a and 57b so that the field-of-view F of the camera 41 is a transverse slice of the illuminated lip 39 as illustrated in FIGS. 2 and 3. However, because the overall height of each container varies from one container to another, the transverse field F will not necessarily slice across the lip 39 at a level representing the widest outer diameter 58 of the lip 39 and may even miss the lip 39 completely as illustrated in FIG. 3. The same problem is encountered when the edge of the lip 39 tapers. Therefore, a cylindrical, plano-convex lens 59 is disposed between the lip camera 41 and the lens 56 to magnify the field F of each pixel in the linear array of the lip camera 41 in a direction parallel to the longitudinal axis of the container 20 to produce a magnified field-of-view F' as illustrated by the broken lines 59a and 59b. As shown in FIG. 3, the magnified field F' insures that the maximum outer diameter 58 of the lip 39 is scanned. Thus, each pixel of the linear array of the lip camera 41 senses an average intensity from the upper portion of the magnified field F' to the lower portion of the field F'. Unlike any equipment presently available, a "linear" scan camera 41 is being used to obtain "two-dimensional" information. As mentioned above, the one-camera embodiment of the optical head 22 comprises only the lip camera 41 and the associated optics just described.

Figure 4:
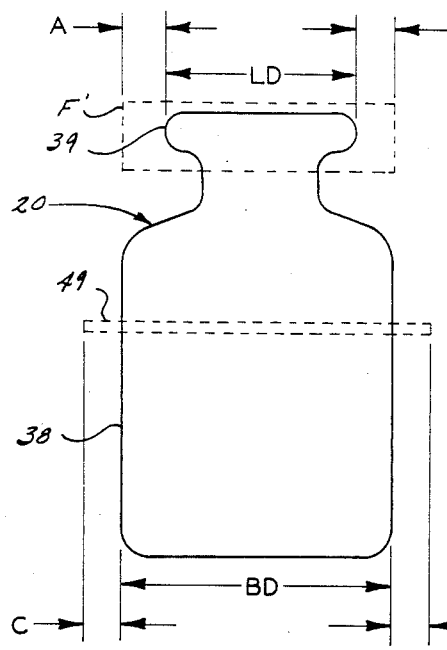
FIG. 4 is a partially schematic, vertical sectional view of a nondefective container showing the field of view for both cameras of FIG. 1 in accordance with the invention.

The pixels of the linear array in the lip camera 41 sense the transmitted beam 51' and are interrogated to provide a series of signals each having a magnitude corresponding to the intensity of light sensed. Since the transmitted beam 51' contains a shadow of the lip 39, the pixel signal provided in the left periphery of the field F', i.e., from the left edge of the field F' to the left edge of the lip 39, and the pixel signals provided in the right periphery of the field F', i.e., from the right edge of the lip 39 to the right edge of the field F', each have a relatively large magnitude because the corresponding pixels sense the high intensity of the unobstructed portion of the transmitted beam 51'. Consequently, the pixel signals provided between the two peripheries, i.e., from the left edge to the right edge of the lip 39, have a relatively small magnitude because the correponding pixels sense the relatively low intensity of the shadowed portion of the transmitted beam 51'. Referring to FIG. 4, the number of pixels in each periphery is counted to obtain a left periphery count A and a right periphery count B. Since the total number of pixels TL in the linear array of the lip camera 41 is fixed, the outer diameter LD of the lip 39 can be calculated according to the following equation, EQ No. 1:

$$LD = [TL - (A+B)]PWL,$$

where PWL is equal to the correponding unit of length sensed per each pixel. The lip diameter LD can then be computed for each of the plurality of scans of the pixels as the container 20 is being rotated. After each scan, the lip diameter LD is compared to a maximum scan diameter stored during the previous scan and the larger of the compared diameters is stored as the maximum scan diameter for that scan. After all of the scans have been completed, the largest scanned diameter LDMAJ is ultimately obtained. After each scan, the lip diameter LD is also compared to a minimum scan diameter stored during the previous scan and the smaller of the compared diameters is stored as the minimum scan diameter for that scan. After all of the scans have been completed, the smallest scan diameter LDMNR is ultimately obtained.

Figure 6:
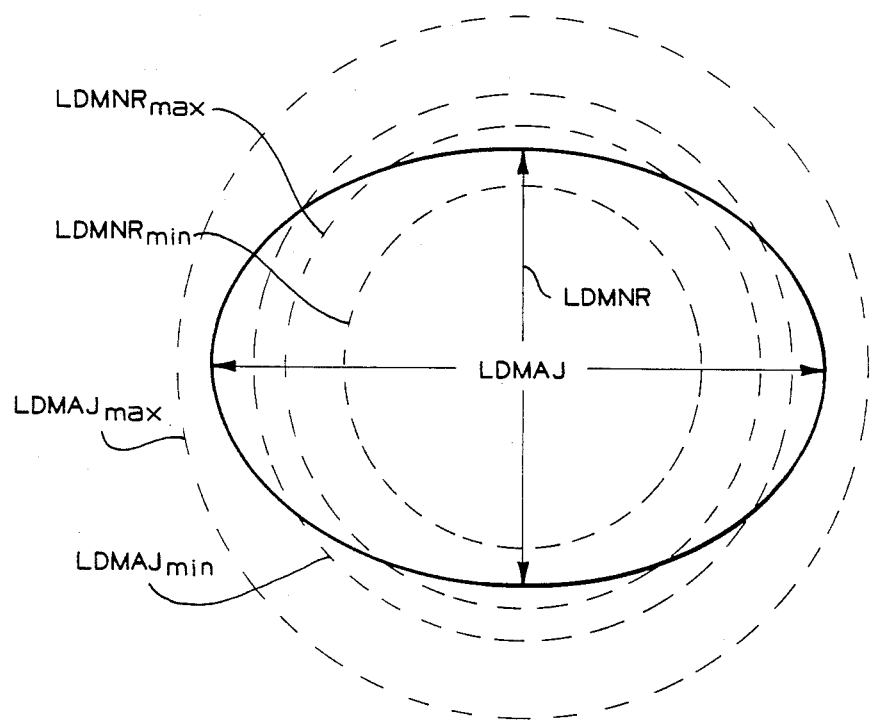
FIG. 6 is a partially schematic, horizontal sectional view of the finish of a container showing the maximum and minimum scan diameters being measured against corresponding criteria by the system of FIG. 1 in accordance with the invention.

The existence of a largest diameter LDMAJ and a smaller diameter LDMNR illustrates that the finish of a container and the lip thereof are never perfectly round, but rather oval in shape as illustrated in FIG. 6 where the largest diameter LDMAJ and the smallest diameter LDMNR are the major and minor axis, respectively. In the past, the lips of such containers were measured with a cup gauge as described above. The cup gauge is a device comprising two cups, one cup having an inner-diameter that is supposed to fit over the lip of each and every container, i.e. the GO test, and the other cup having a minimum inner-diameter that is not supposed to fit over the lip of any one of the containers, i.e., a NO-GO test. If the large cup did not fit over the lip of the container or if the small cup did fit over the lip of the container, the container was rejected. Thus, the cup gauge is actually measuring the major axis LDMAJ against a maximum and a minimum tolerance. Correspondingly, the instant invention compares the major axis or the largest lip diameter LDMAJ to a maximum tolerance LDMAJmax and a minimum tolerance LDMAJmin. If the largest scan diameter LDMAJ is not between these predetermined tolerances, the container is rejected. To this extent, the instant invention tests the container for meeting the same commercial tolerances measured by the cup gauge, but does so automatically and without contact. Automatic equipment presently available accomplishes gauging by contact with the finish which can be chipped as a result of such contact. The instant invention is a significant breakthrough in that no such contact is required. Furthermore, the instant invention also provides a measurement of the minor axis or the smallest scanned diameter LDMNR which also can be tested against a set of tolerances as indicated by the broken circles LDMNRmax and LDMNRmin. This capability was also previously unavailable.

The instant invention is also capable of measuring the ovality and eccentricity of the lip 39 by comparing either one of the periphery counts, i.e., the left periphery count A, to a maximum count of the same periphery stored during the previous scan, and then storing the larger of the compared counts for the present scan. After all of the scans have been completed, a maximum periphery count Amax is ultimately obtained. The same periphery count, the left periphery count A, is also compared to a minimum periphery count of the same periphery stored during the previous scan, and then storing the smaller of the compared counts for the present scan. After all of the scans have been completed, a minimum periphery count Amin is ultimately obtained. The measure of ovality and eccentricity, TIRONE, is determined by subtracting the minimum periphery count Amin from the maximum periphery count Amax. If the ovality and eccentricity TIRONE exceeds a predetermined value TIRMAX, the container is rejected. The cup gauge, as well as other techniques, do not test the container for ovality and eccentricity.

In the two-camera mode, the pixels of the linear array in the body camera 42 sense the transmitted beam 43' and are scanned to provide a series of pixel signals each having a magnitude corresponding to the intensity of light sensed. The pixel signals provided in the left periphery of the field 49, i.e., from the left edge of the field 49 to the left edge of the body 38, and in the right periphery of the field 49, i.e., from the right edge of the body 38 to the right edge of the field 49, each have a relatively large magnitude because the corresponding pixels sense the high intensity of the unobstructed portion of the transmitted beam 43'. Consequently, the pixel signals provided between the two peripheries from the left edge to the right edge of the body 38 have a relatively small magnitude because the corresponding pixels sense the low intensity of the obstructed portion of the transmitted beam 43'. Referring to FIG. 4, the number of pixel signals in each periphery are counted to obtain a left periphery count C and a right periphery count D. Since the total number of pixels TB in the linear array of the body camera 42 is fixed, the outer diameter BD of the body 38 can be calculated according to the following equation, EQ No. 2:

$$BD = [TB - (C+D)]PWB$$

where PWB is equal to the corresponding unit of length sensed per each pixel. The body diameter BD can then be computed for each of a plurality of scans of the pixels as the container 20 is being rotated.

Figure 5:
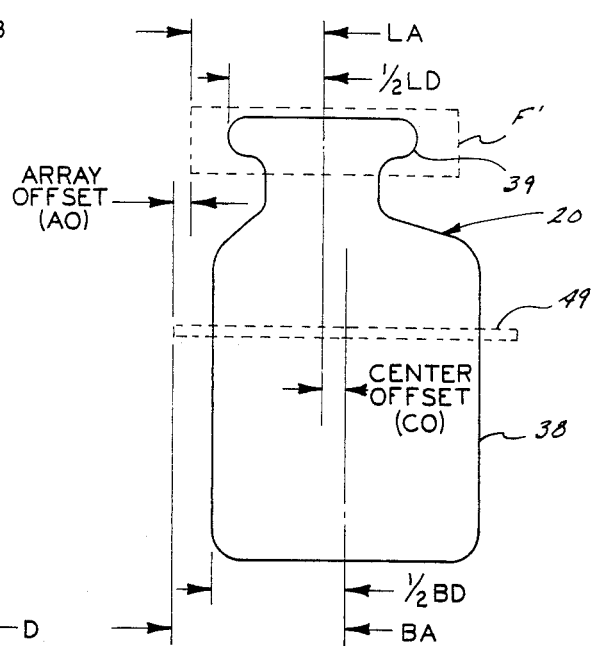
FIG. 5 is a partially schematic, vertical sectional view of a defective container and the field of view associated with each of the cameras of FIG. 1 in accordance with the invention.

The purpose of gathering periphery count data, C and D, for the body 38 of the container 20 is to provide a more precise and a separate measurement for the ovality and eccentricity by compensating for the motion of the longitudinal axis of the body 38 while the container 20 is being rotated. The measurement of ovality and eccentricity in the one-camera embodiment TIRONE can be used to detect a container having an oval lip concentrically aligned with the body, a round lip eccentrically aligned with the body, or a combination of various degrees of both ovality and eccentricity. The one-camera embodiment is not capable of distinguishing between an ovality and an eccentricity measurement, whereas the two-camera embodiment can. Referring to FIG. 5, the lip diameter LD (EQ No. 1) and the body diameter BD (EQ No. 2) for each scan are used to calculate a lip offset distance LA, i.e., the distance between the edge of the lip field F' in the mid point of the field diameter LD, and a body offset distance BA, i.e., the distance between the edge of the body field 49 and the mid point of the body diameter BD, according to the following equations, EQ No. 3 and EQ No. 4:

$$LA = A + LD/2 \text{ and}$$

$$BA = M(C + BD/2)$$

where M represents the magnification difference between the lip field F' and the body field 49. The offset distances LA and BA are then used to calculate a measure of ovality OV and eccentricity CO, the center offset, according to the following equations, EQ No. 5 and EQ No. 6:

$$OV = BA - A + AO \text{ and}$$

$$CO = BA - LA + AO,$$

where AO is equal to the offset between the linear array of the lip camera 41 and the linear array of the body camera 42. The ovality OV and the eccentricity CO are computed for each scan as the container 20 is being rotated. After each scan, the ovality OV and the eccentricity CO are each compared with corresponding maximum and minimum values stored during the previous scan, and the larger and smaller, respectively, are stored as the maximum and minimum values for the present scan. After all the scans have been completed, the maximum ovality OVmax, the minimum ovality OVmin, the maximum eccentricity COmax and the minimum eccentricity COmin are all ultimately obtained. These values are then used to calculate the ovality TIRTWO and the eccentricity OFFSET of the lip 39 according to the following equations, EQ No. 7 an EQ No. 8:

$$TIRTWO = OVmax - OVmin \text{ and}$$

$$OFFSET = (COmax - COmin)/2.$$

If the ovality TIRTWO exceeds the previously mentioned predetermined value TIRMAX, the container 20 is defective and will be rejected. Additionally, if the eccentricity OFFSET exceeds a predetermined value OFFMAX, the container 20 is defective and will be rejected. Neither the cup gauge or any other prior art device are capable of independently measuring the ovality and eccentricity.

Referring back to FIG. 1 to describe the details of construction, the optical control 23 comprises a lip camera control 61 and a body camera control 62 which are connected to the lip camera 41 and the body camera 42 via wires 24 and 25, respectively. Each of the camera controls 61 and 62 are components of the model CCD1300R referenced above. The pixel signals resulting from a scan of the pixels in the linear arrays of the cameras 41 and 42 are provided by the lip camera control 61 and the body camera control 62 along the lines 63 and 64, respectively, to a body data circuit 65 and lip data circuit 66, respectively. The data circuits 65 and 66 are responsive to the magnitudes of the pixel signals in each scan for providing the left and right periphery counts for the lip field F' and the body field 49, i.e., A and B, and C and D, respectively. The lip data circuit 65 and the body data circuit 66 are connected by bidirectional lines 68 and 67, respectively, to a system control 69. The system control 69 receives a signal from the position detector 26 along the line 27 indicating that the pocket 31 transporting the container 20 is in position at the inspection station 32. The system control 69 also provides a signal to the reject mechanism 28 along the line 29 to reject a defective container after being scanned at the inspection station 32. Both the lip data circuit 65 and the body data circuit 66 are controlled by a MAIN PROGRAM stored in a microcomputer 71 which is connected to the lip data circuit 65 and the body data circuit 66 via bidirectional buses 72 and 73, respectively.

Figure 7:
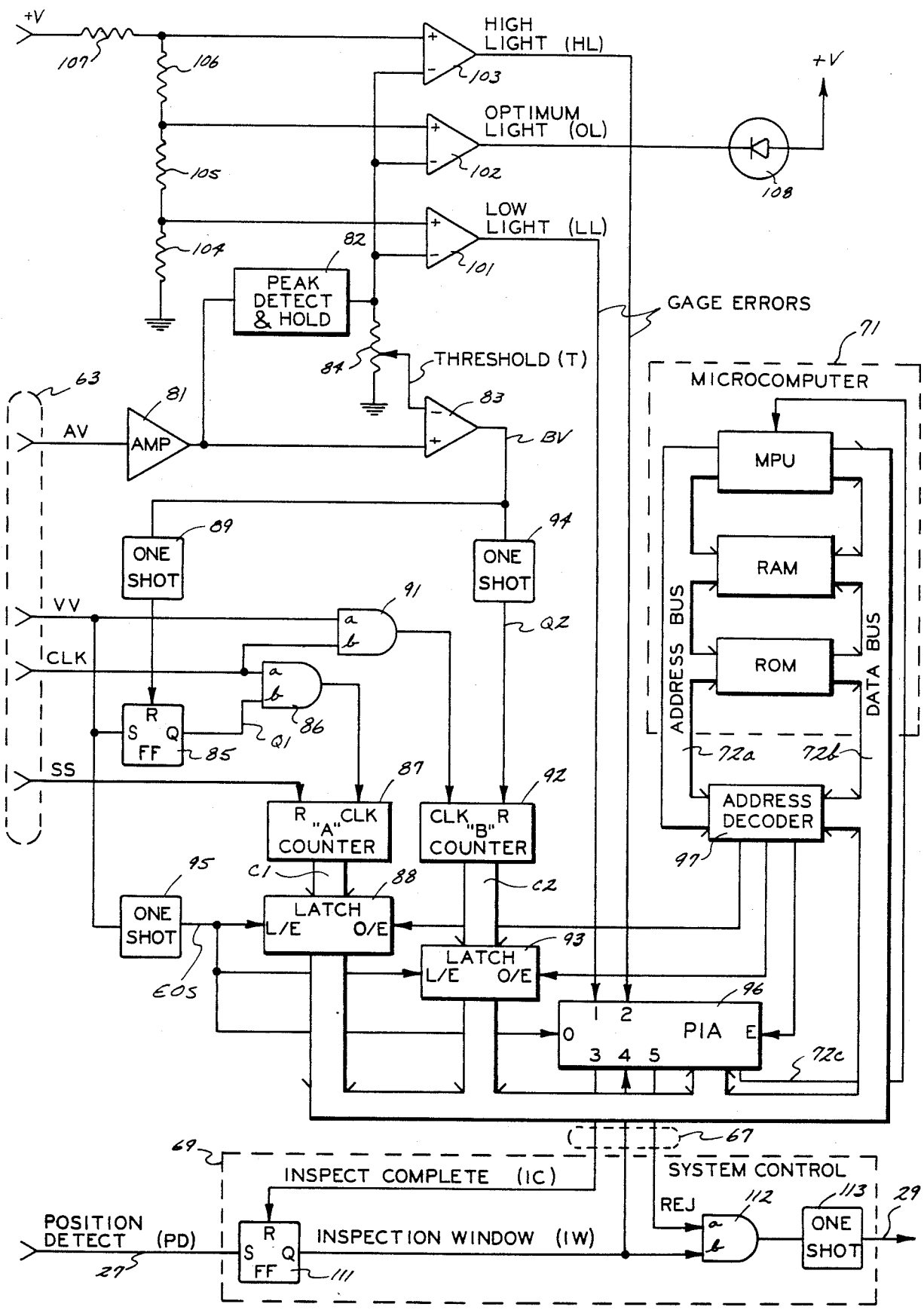
FIG. 7 is an electrical schematic of the lip data circuit, the microcomputer and the system control of FIG. 1 in accordance of the invention.
Figure 8:
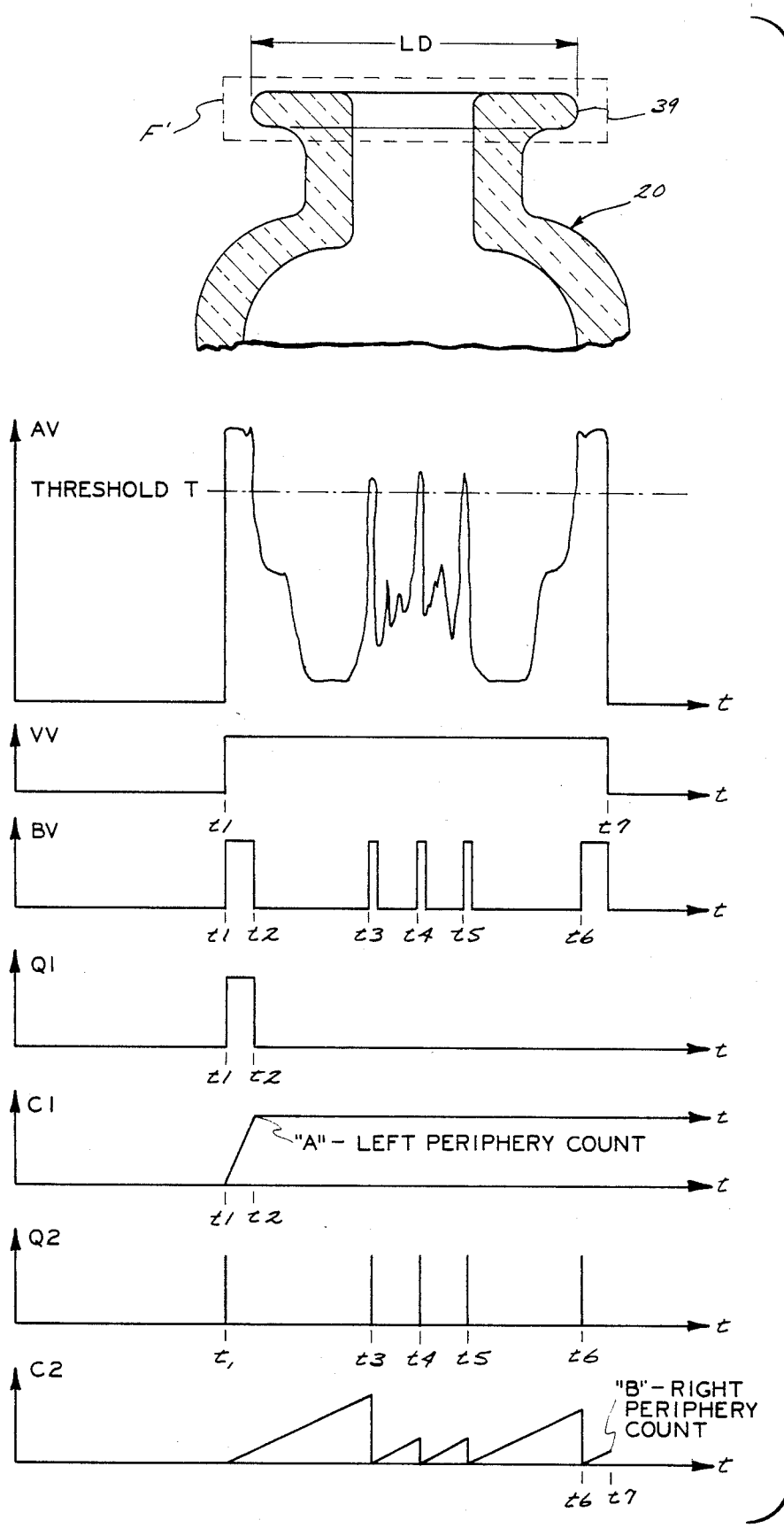
FIG. 8 is a plurality of graphs each one of which illustrates a signal associated with the lip data circuit of FIG. 7 with respect to time as compared to the field of view of the finish of the container according to the invention.

Referring in more detail to FIG. 7, an electrical schematic of the lip data circuit 65, the system control 69 and the microcomputer 71 is shown. The body data circuit 66 is schematically similar to the lip data circuit 65 and interfaces in parallel with the system control 69 and the microcomputer 71. Therefore, details of the body data circuit 66 are not shown and described. The lip camera control 61 (FIG. 1) provides the lip data circuit 65 with an analog video signal AV, a video valid signal VV, a clock signal CLK, and a start scan signal SS via the line 63. The analog video signal AV is provided to the input of an amplifier 81, the output of which is connected to the input of a peak detect and hold circuit 82 and the noninverting terminal of a comparator 83. The output of the peak detect and hold circuit 82 is connected to a grounded variable resistor 84, the wiper of which provides a threshold voltage signal T to the inverting terminal of the comparator 83. The comparator 83 provides a binary video signal BV at its output. Referring also to the time graphs of FIG. 8, the analog video signal AV is shown as it corresponds with the pixels of the lip camera 41 (FIG. 1) from which it is derived. As described above, the transmitted beam 51' (FIG. 1) is relatively unobstructed in the left periphery so that the magnitude of the pixel signals from the left edge of the lip field F' to the left edge of the lip 39 are relatively large. This causes the lip camera control 63 to provide an analog video signal AV (FIGS. 7-8) having a relatively large magnitude from a time t1 to a time t2. During this time period, the binary video signal BV is a logic one because the magnitude of the analog video signal AV is greater than that of the threshold signal T. However, when the scanning reaches those pixels shadowed by the lip 39, the magnitude of the pixel signals becomes relatively small so that the lip camera control 63 (FIG. 1) provides an analog video signal AV (FIGS. 7-8) having a smaller magnitude. When the magnitude of the analog video signal AV drops below that of the threshold signal T, as it does at the time t2, the binary video signal returns to a logic 0. Therefore, the binary video signal BV goes to a logic 1 whenever the analog video signal AV exceeds the threshold signal T, and then returns to a logic 0 when the analog video signal AV drops below the threshold signal T. As can be seen in FIG. 8, the binary video signal BV also cycles in such fashion at the times t6 and t7 when the lip camera control 63 is scanning the right periphery. Such cycling can also occur when the lip camera control 63 (FIG. 1) is scanning the intermediate shadowed pixels when the magnitude of the analog control signal AV increases sufficiently to breach the threshold signal T such as, for example, at times t3, t4 and t5. In any event, the threshold signal T is adjustable to prevent such breaches, and when so adjusted, remains a fixed percentage of the maximum analog video signal AV as provided by the peak detect and hold circuit 82 (FIG. 7). The binary video signal BV is provided to the inputs of a first periphery means for providing the left periphery count A and to a second periphery means for providing the right periphery count B.

The first periphery means comprises a flip-flop 85 (FIG. 7), an AND gate 86, a counter 87, a latch 88 and a one-shot multivibrator 89. The video valid signal VV, which is present during the actual scanning of the pixels of the linear array of the lip camera 41, is provided to the set input S of the flip-flop 85, the Q output of which is connected to an input 86b of the AND gate 86. The clock signal CLK, which is synchronous with the interrogation of the pixels of the linear array of the lip camera 41, is provided to an input 86a of the AND gate 86, the output of which is connected to the clock input CLK of the counter 87. The start scan signal SS, which is provided at the initiation of the interrogation of the pixels, is provided to the reset input R of the counter 87 to clear it before it begins tallying the clock pulses. The output of the counter 87 is provided to the latch 88 via a bus C1. The binary video signal BV is provided to the input of the one-shot 89, the output of which is provided to the reset terminal R of the flip-flop 85. Referring also to the time graphs of FIG. 8, the counter 87 begins tallying clock pulses when the flip-flop 85 is set by the video valid signal VV at the time t1 so that the Q output of the flip-flop 85 goes high at Q1 to enable the clock pulses CLK via the AND gate 86, thereby causing the counter 87 to increment. When the binary video signal BV goes negative at the time t2 indicating the left edge of the lip 39, it triggers the one-shot multivibrator 89 to reset the flip-flop 85 which inhibits the clock pulses CLK to the counter 87. As a result, the number present at the output of the counter 87 is the left periphery count A as illustrated by C1 in FIG. 8. After the time t2, the A-counter 87 will no longer be able to tally clock pulses because the flip-flop 85 is reset for the rest of the scan.

The right periphery means comprises an AND gate 91 (FIG. 7), a counter 92, a latch 93 and a one-shot multivibrator 94. The video valid signal VV and the clock signal CLK are provided to the inputs 91a and 91b respectively, of the AND gate 91, the output of which is connected to the clock input CLK of the counter 92. The binary video signal BV (FIGS. 7-8) is provided to the input of the one-shot multivibrator 94, the output of which is provided to the reset terminal R of the B-counter 92. The output of the counter 92 is provided to the latch 93 via a bus C2. At the beginning of the scan, the video valid signal VV (FIGS. 7-8) enables the clock pulses CLK via the AND gate 91 so that the counter 92 begins to increment. Each time the binary video signal BV goes positive, it triggers the one-shot multivibrator 94 to reset the counter 92 as indicated by the signal Q2 at the times t3, t4, t5 and t6. After the counter 92 is reset, it immediately begins retallying the clock pulses CLK from a zero count as illustrated by C2 in FIG. 8. When the binary video signal BV goes positive at the time t6 indicating the right edge of the lip 39, the counter 92 begins tallying the right periphery count B. After the lip camera control 61 (FIG. 1) has interrogated the total number of pixels so that the video valid signal VV (FIGS. 7-8) goes negative at the time t7, the clock pulses CLK provided to the counter 92 are inhibited. As a result, the number at the output of the counter 92 presented to the latch 93 is the right periphery count B as illustrated by C2 in FIG. 8. The video valid signal VV is also provided to a one-shot multivibrator 95, the output of which is connected to the latch enable inputs L/E of the latches 88 and 93. Therefore, at the end of the scan, the video valid signal VV triggers the one-shot multivibrator 95 to store the left and right periphery counts, A and B respectively, for presentation to the microcomputer 71 via the data bus 72b. The left and right periphery counts for the body 38, C and D, would be triggered for presentation to the microcomputer 71 via the bus 73 in the same manner.

The one-shot multivibrator 95 also provides a signal to a peripheral interface adapter 96 via a peripheral input data line PIA(0). The microcomputer 71 addresses the latches, 88 and 93, and the peripheral interface adapter 96 by a decoder 97 connected thereto by the address and data buses, 72a and 72b, respectively. The outputs of the address decoder 97 are connected to the output enable terminals O/E of the latches, 88 and 93, and the output/input enable terminal E of the peripheral interface adapter 96. The peripheral interface adapter 96 is bidirectionally connected to the data bus 72b and provides nonmaskable interrupts NMIs and interrupt requests IRQs to the microprocessor unit MPU of the micropcomputer 71 along the line 72c.

The lip data circuit 65 (FIGS. 1 and 7) also comprises means for providing an error signal if the maximum analog video signal AV is either too low or too high. The output of the peak detect and hold circuit 82 (FIG. 7) is also connected to the inverting terminals of three comparators 101, 102 and 103. The noninverting input of the comparator 101 is connected to the juncture between a grounded resistor 104 and one end of a resistor 105. The noninverting input of the comparator 102 is connected to the juncture between the other end of the resistor 105 and one end of the resistor 106. The noninverting input of the comparator 103 is connected to the juncture between the other end of the resistor 106 and one end of the resistor 107, the other end of which is connected to a source of positive voltage V. The output of the comparator 101 provides a low light signal LL to the peripheral interface adapter 96 via a peripheral input data line PIA(1) and the output of the comparator 103 provides a high light signal HL to the peripheral interface adapter 96 via a peripheral input data line PIA(2). The output of the comparator 102 provides an optimum light signal OL to the cathode of a light emitting diode 108, the anode of which is connected to the source of positive voltage V. If the peak magnitude of the analog video signal AV is at an optimum level so that it is greater than the voltage being applied to the noninverting input of the comparator 102, the optimum light signal OL will go low so that the light emitting diode 108 provides a visible signal of the optimum condition. However, if the peak magnitude of the analog video signal AV exceeds the voltage being applied to the noninverting input of the comparator 103, a high light signal HL will be provided to the peripheral interface adapter 96 indicating the presence of an error. Correspondingly, if the peak magnitude of the analog video signal AV does not exceed the voltage being applied to the noninverting input of the comparator 101, a low light signal LL will be provided to the peripheral interface adapter 96 indicating the presence of a low light error.

The lip data circuit 65 (FIGS. 1 and 7) also interfaces with the system control 69 and more specifically the peripheral interface adapter 96 (FIG. 7) via the peripheral data lines 67. The system control comprises a flip-flop 111, and AND gate 112, and a one-shot multivibrator 113. When the pocket 31 transporting the container 20 reaches the inspection station 32, the position detector 26 provides a position detect signal PD along the line 27 to the set input S of the flip-flop 111. As a result, the flip-flop is set and its Q output goes high to provide an inspection window signal IW to the peripheral interface adapter 96 via a peripheral input data line PIA(4) and to an input 112b of the AND gate 112. The other input 112a of the AND gate 112 is connected to the peripheral interface adapter 96 via a peripheral output data line PIA(5), which provides a reject signal REJ if the container previously inspected is to be rejected. The output of the AND gate 112 is connected to the input of the one-shot multivibrator 113 which when triggered provides a signal along the line 29 to actuate the reject mechanism 28 at the reject station. The inspection window IW not only tells the computer 71 that the container 20 is ready to be inspected, but also tells the computer 71 that the previously inspected container, if defective, can now be rejected by enabling the AND gate 112. When the container 20 has been completely inspected after a predetermined number of scans, it is instructed to have the peripheral interface adapter 96 provide an inspect complete signal IC to reset the flip-flop 111 via a peripheral output data line PIA(3).

Figure 9:
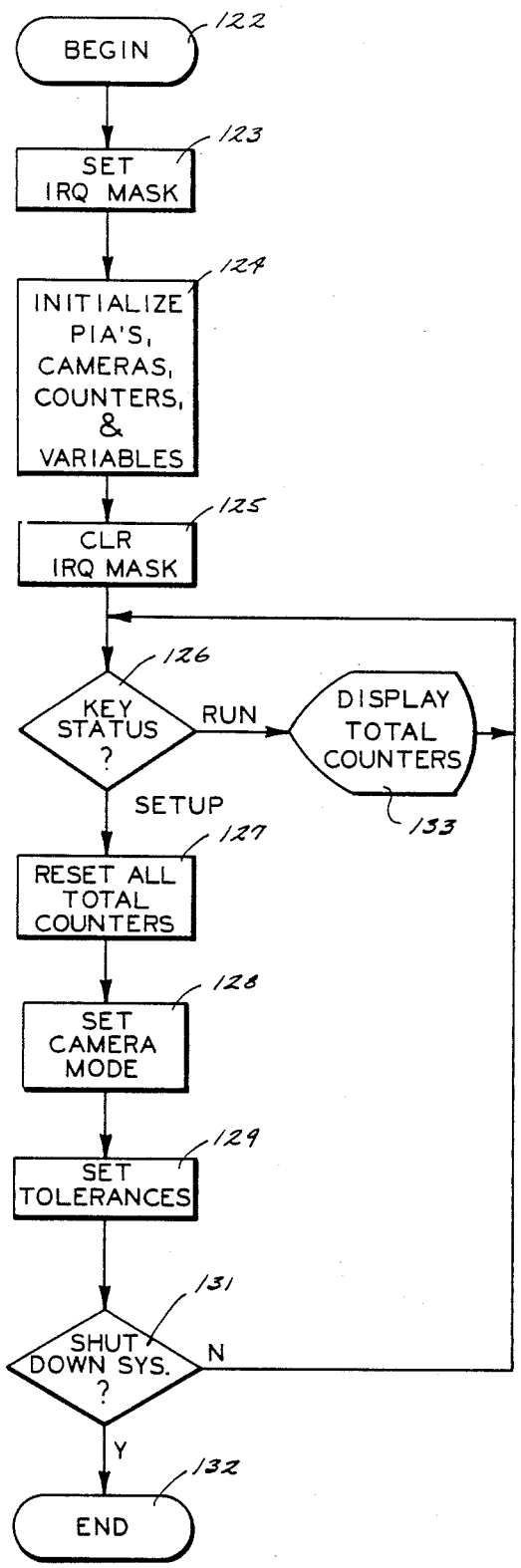
FIGS. 9-12 are simplified logic flow charts of a portion of the program in the microcomputer of FIG. 1 for processing information received from the lip and body data circuits to determine the diameters, ovality and eccentricity of the finish of the container in accordance with the invention.

As mentioned above, both the lip data circuit 65 (FIGS. 1 and 7) and the body data circuit 66 (FIG. 1) are controlled by a MAIN PROGRAM stored in the RAM of the microcomputer 71. FIG. 9 shows a simplified logic flow chart of a portion of the MAIN PROGRAM indicated generally at 121. When the MAIN PROGRAM 121 begins at 122, the software sets an IRQ mask at 123. The MAIN PROGRAM 121 next enters an initializing function at 124, in which the peripheral interface adapters, the cameras and the counters of the lip and body data circuits 65 and 66 are all initialized. Furthermore, the stored variables are initialized to provide a subsequent basis for comparison when processing begins. The stored variables include the maximum and minimum periphery counts, Amax and Amin respectively, the largest and smallest scanned diameter, LDMAJ and LDMNR, the maximum and minimum ovality, OVmax and OVmin, respectively, and the maximum and minimum eccentricity, COmax and COmin, respectively. After the initializing function, the MAIN PROGRAM 121 clears the IRQ mask at 125. The MAIN PROGRAM 121 then enters a decision point at 126 for checking the status of a key set by an operator to indicate whether the system 21 (FIG. 1) is in a RUN mode or a SETUP mode. If the status of the key is in the SETUP mode, the MAIN PROGRAM 121 branches at SETUP and resets total counters at 127 which include a counter for storing the total number of containers inspected, a counter for storing the total number of non-defective containers, a counter for storing the total number of defective containers, and a counter for storing the total number of rejected containers. After the MAIN PROGRAM 121 checks the status of the mode key, it then sets a flag to indicate whether the system is operating in the one-camera mode or the two-camera mode at 128. The MAIN PROGRAM 121 then enters another initializing function at 129 in which the tolerances are set for the largest scanned diameter, LDMAJmax and LDMAJmin, the smallest scanned diameter, LDMNRmax and LDMNRmin, the ovality, TIRMAX, and the eccentricity, OFFMAX. After the MAIN PROGRAM 121 accomplishes all the functions in the SETUP mode, it enters a decision point at 131 to determine whether the operator has decided to shut down the system. If the operator has decided to shut down the system, the MAIN PROGRAM 121 branches at Y and terminates at 132. If, on the other hand, the operator has not decided to shut down the system, the MAIN PROGRAM 121 branches at N and returns to the key status decision point at 126. When the SETUP mode has been completed and the operator changes the key to the RUN mode, the MAIN PROGRAM 121 branches at RUN and enters a subroutine at 133 for displaying the total counters described above. Once the operator has positioned the key in the RUN mode, the MAIN PROGRAM 121 continues to loop through the display subroutine 133 and back to check the status of the mode key at 126.

Figure 10:
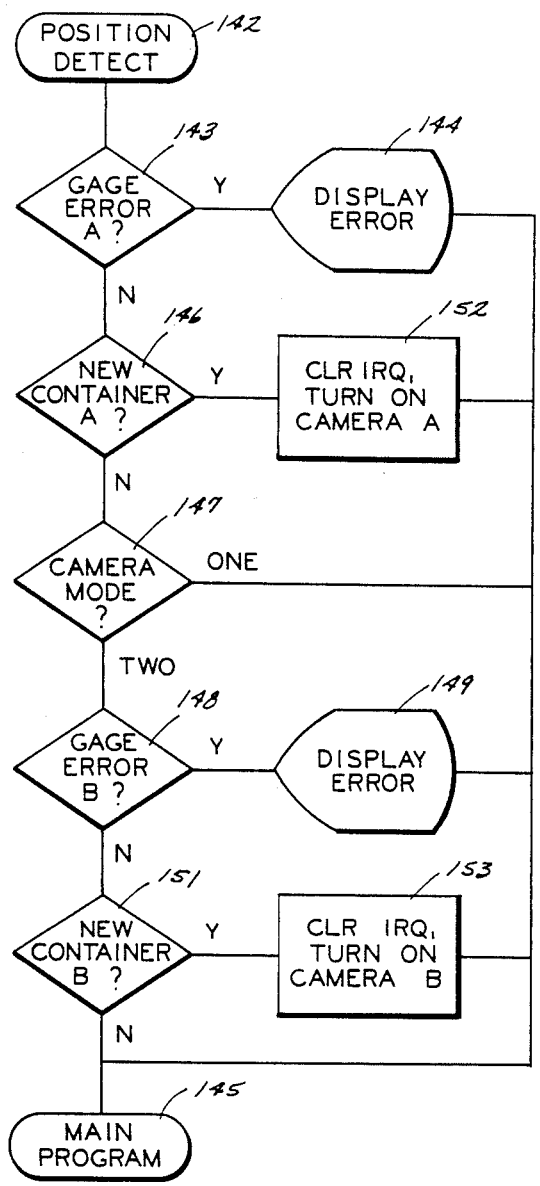

Once the MAIN PROGRAM 121 has cleared the IRQ mask at 125, an IRQ interrupt can be initiated by a position detect signal PD which causes an inspection window signal IW to be provided to the peripheral input data line PIA(4). FIG. 10 shows a simplified logic flow chart of a portion of an IRQ interrupt program at 141. When the IRQ interrupt 141 is initiated by the position detect signal PD at 142, the MAIN PROGRAM 121 is looping in the RUN mode. Assuming that the MAIN PROGRAM 121 is in the SETUP mode, the IRQ program 141 enters a decision point at 143 to first check for a gauge error associated with the lip camera 41 (FIG. 1) and provided by the lip data circuit 65 as described above. If a high light HL or low light LL error is indicated, the IRQ program 141 branches at Y to 144 and displays the error to the operator. The IRQ program 141 then returns to the MAIN PROGRAM 121 at 145. If, on the other hand, there are no gauge errors associated with the lip camera 41, the IRQ program 141 branches at N to another decision point at 146 to determine whether the lip camera 41 has, in fact, detected a new container. If a new container has not been detected, the IRQ program 141 branches at N to another decision point at 147 to determine whether the system 21 is in the one-camera mode or the two-camera mode. If the system 21 is in the one-camera mode, the IRQ program 141 branches at ONE to return to the MAIN PROGRAM 121 at 145. If, however, the system 21 is in the two-camera mode, the IRQ program 141 branches at TWO to a decision point at 148 for determining whether there are any gauge errors associated with the body camera 42. If a high light HL or low light LL error has been detected, the IRQ program 141 branches at Y to 149 and displays the error. The IRQ program 141 then returns to the MAIN PROGRAM 121 at 145. If, however, no gauge errors are detected, the IRQ program 141 branches at N to a decision point at 151 for determining whether the body camera has, in fact, detected a new container. If a new container has not been detected, the IRQ program 141 brances at N and returns to the MAIN PROGRAM 121 at 145. If either the lip camera 41 or the body camera 42 detects a new container at 146 or 151, respectively, the IRQ program 141 branches at Y to 152 or 153, respectively, to clear the IRQ interrupt and turn on either one or both cameras 41 and 42 depending on the mode set in the MAIN PROGRAM 121 at 128. In either case, the IRQ program 141 returns to the MAIN PROGRAM 121 at 145.

Figure 11:
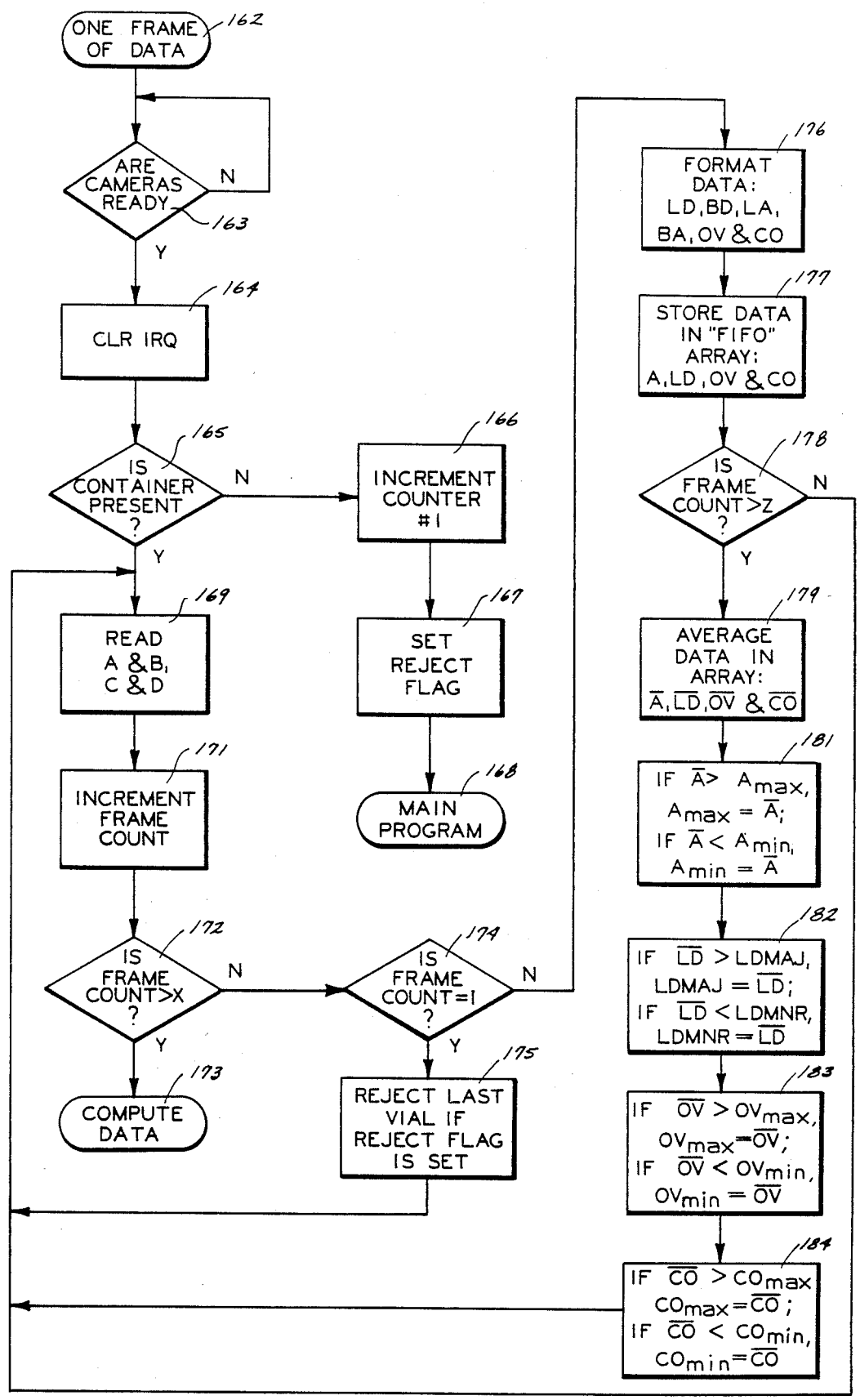

As soon as the cameras 41 and 42 (FIG. 1) are turned on, they begin gathering data as the camera control 61 and 62 begin scanning the pixels. After one frame of data, i.e., one scan of all the pixels, has been acquired, a nonmaskable interrupt NMI is issued. FIG. 11 shows a simplified logic flow chart of a portion of an NMI interrupt program 161. The NMI program 161 begins at 162 after one frame of data has been acquired and enters a decision point at 163 to determine whether both cameras 41 and 42 are ready. If the cameras are not ready, the NMI program branches at N and loops back for the same interrogation. If the cameras 41 and 42 are ready, the NMI program 161 branches at Y to clear all IRQ interrupts at 164. While the NMI interrupt is issued, the execution of the NMI program 161 cannot be interrupted by an IRQ. The NMI program 161 next proceeds to a decision point at 165 to determine whether the container itself is present in the pocket 31 (FIG. 1). For example, the container itself may be missing or the finish of the container may be broken off. In either case, the NMI program 161 branches at N and increments total counter #1 at 166 which tallies the number of missing or broken containers. The NMI program 161 then sets the reject flag at 167 so that container can be removed at the reject station while the next container is being inspected. The NMI program 161 then returns to the MAIN PROGRAM 121 (FIG. 9) at 168. Returning to the decision point at 165, if the container is present, the NMI program 161 branches at Y to read the left and right periphery counts of the lip camera 41, A and B, and the left and right periphery counts of the body camera 42, C and D, at 169. The NMI program 161 then increments the frame count at 171 and enters a decision point at 172 to determine whether the frame count is greater than X, the total number of scans for a complete inspection of the container as it is being rotated. In the preferred embodiment, X is equal to 180 scans per container or one scan for every two degrees of rotation. If X frames of data have already been acquired for the container being inspected, the NMI program 161 branches at Y to a subroutine at 173 for computing the data values which will be discussed below. If, however, the frame count is less than X because the container has not been completely inspected, the NMI program 161 branches at N to a decision point at 174 for determining whether the frame count is equal to one. If the frame count does equal one, the NMI program 161 branches at Y to a reject function at 175. It is at this point that the software instructs the microcomputer 71 to reject the previously inspected container if it was identified as being defective. Implicitly, the container cannot be rejected before reaching the reject station; it can only be rejected when in position at the rejection station while the present container is being scanned at the inspection station 32 (FIG. 1). In any event, the NMI program 161 returns to read another frame of periphery counts, A and B, and C and D, at 169.

Returning to the decision point at 174 (FIG. 11), if the frame count is greater than one, the NMI program 161 branches at N to a processing function at 176 in which the above measured data is formatted to calculate LD, BD, LA, BA, OV and CO as defined above in Equation Nos. 1-6, respectively. If the system 21 (FIG. 1) is in the one-camera mode, only the lip diameter LD is calculated. The NMI program 161 then proceeds to another processing function at 177 in which a portion of the formatted data, A, LD, OV and CO, is stored for further computation in a FIFO array having dimensions of $(1 \times z)$, where Z is a number less than 10. When the array is filled, the next data item inserted into the array forces out the first item inserted into the array, so that the contents of the array will always be "moving" and include the "Z" most-recent data items. The NMI program then enters a decision point at 178 to determine whether the FIFO array has initially been filled by checking whether the frame count is greater than Z. If the frame count is not greater than Z, the NMI program 161 branches at N back to 169 to read more data. If, however, the frame count is greater than Z, the NMI program 161 branches at Y to enter a processing function at 179 in which the computational data in the FIFO array is averaged to provide "moving" averages, $\overline{A}$, $\overline{LD}$, $\overline{OV}$ and $\overline{CO}$. The purpose of the moving average is to smooth out the measured data and provide more accurate readings. The NMI program 161 then proceeds to a comparison function at 181 in which the average left periphery count $\overline{A}$ is compared to a maximum count Amax and to a minimum count Amin. If the average left periphery count $\overline{A}$ is greater than the maximum periphery count Amax, the maximum periphery count Amax is set equal to the average periphery count $\overline{A}$. If the average periphery count $\overline{A}$ is less than the minimum periphery count Amin, the minimum periphery count Amin is set equal to the periphery count $\overline{A}$. The NMI program 161 then enters another comparison function at 182 in which the lip diameter $\overline{LD}$ is compared to the largest scanned diameter LDMAJ and the smallest scanned diameter LDMNR. Correspondingly, the largest scanned diameter LDMAJ is set equal to the average lip diameter $\overline{LD}$ if the latter is greater than the former, and the smallest scanned diameter LDMNR is set equal to the average lip diameter $\overline{LD}$ if the latter is less than the former. If the system 21 is in the two-camera mode, the NMI program 161 enters two more comparison functions at 183 and 184 to substitute the average ovality at $\overline{OV}$ and the average eccentricity $\overline{CO}$ when appropriate. These two functions are bypassed when the system 21 is in the one-camera mode and a comparison of TIRONE is substituted. The maximum ovality OVmax is set equal to the average ovality $\overline{OV}$ if the latter is greater than the former and the minimum ovality OVmin is set equal to the average ovality $\overline{OV}$ if the latter is less than the former. Correspondingly, the maximum eccentricity COmax is set equal to the average eccentricity $\overline{CO}$ if the latter is greater than the former and the minimum eccentricity COmin is set equal to the average eccentricity $\overline{CO}$ if the latter is less than the former. Once the comparison functions 181 through 184 have been accomplished, the NMI program 161 returns to 169 to read the next frame of periphery counts, A and B, and C and D. After all of the scans have been completed, the maximum and minimum values Amax, Amin, LDMAJ, LDMNR, OVmax, OVmin, COmax, and COmin will be equal to the largest and smallest values, respectively, of each of the corresponding moving averages. Also, the frame count will be greater than X so that the NMI program 161 branches at 172 to the subroutine for computing the data at 173.

Figure 12:
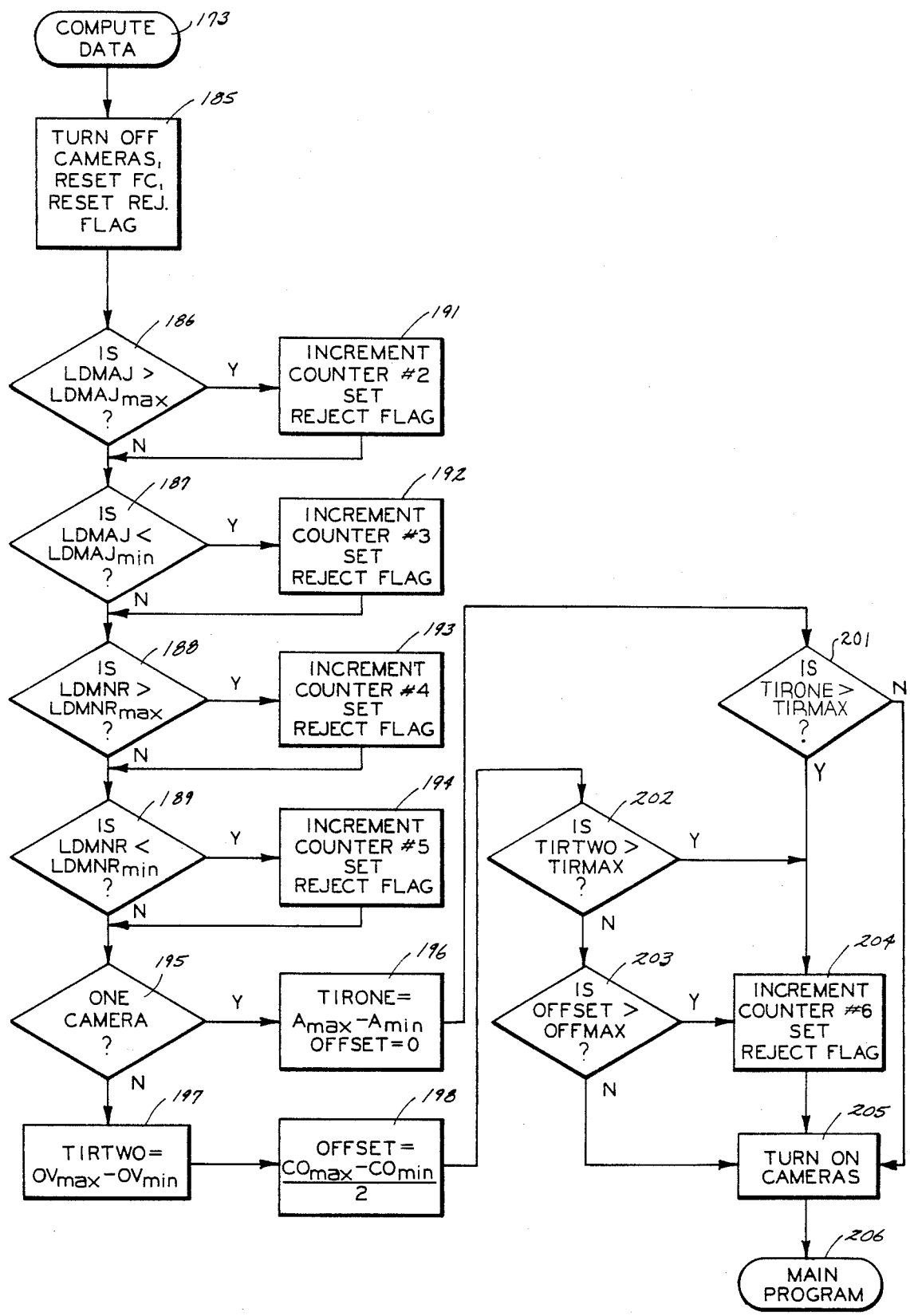

FIG. 12 shows a simplified logic flow chart of a portion of the subroutine for computing the data at 173. Since the container has been completely inspected, the subroutine 173 turns off the cameras, resets the frame count, FC, and resets the reject flag at 185. The subroutine 173 then enters a series of four comparison functions 186 through 189 in which the largest scanned diameter LDMAJ and the smallest scanned diameter LDMNR are compared to their respective maximum and minimum tolerances. If the largest scanned diameter LDMAJ is greater than its maximum tolerance LDMAJmax at 186, the subroutine 173 branches to 191 to increment total counter #2 and set the reject flag for that container. This, of course, corresponds to the GO test of the cup gauge described above. If the largest scanned diameter LDMAJ is less than its minimum tolerance LDMAJmin at 187, the subroutine 173 branches to 192 to increment total counter #3 and set the reject flag for that container. This, of course, corresponds to the NO-GO test of the cup gauge described above. Correspondingly, if the smallest scanned diameter LDMNR is greater than its maximum tolerance LDMNRmax at 188 or less than its minimum tolerance LDMNRmin at 189, the subroutine 173 branches to 193 or 194, respectively, to increment total counter #4 or #5, respectively, and set the reject flag for that container. If it were not desirable to compare the smallest scanned diameter LDMNR to its respective tolerances, the subroutine 173 branches automatically from 187 or 192 to 195 (not shown). The subroutine 173 then enters a decision point at 195 to check whether the system 21 (FIG. 1) is in the one-camera mode or the two-camera mode. If the system 21 is in the one-camera mode, the subroutine 173 branches at Y to 196 and sets the one-camera ovality TIRONE equal to the difference between the maximum and the minimum periphery count (Amax-Amin) and sets the measurement for eccentricity OFFSET equal to zero. If the system at 21 is in the two-camera mode, the subroutine 173 branches at N to 197 to set the two-camera measurement for ovality TIRTWO equal to the difference between the maximum and the minimum ovality (OVmax-OVmin) and then proceeds to 198 to set the measurement for eccentricity OFFSET equal to the difference between half the maximum and half the minimum eccentricity, (COmax-COmin)/2. In any event, the subroutine 173 next enters a series of comparison decision points 201 through 203 to determine whether either of the measured ovalities TIRONE at 201 or TIRTWO at 202 exceed the maximum tolerance TIRMAX and whether the measured eccentricity OFFSET at 203 is greater than its maximum tolerance OFFMAX. If either tolerance, TIRMAX or OFFMAX is breached, the subroutine 173 increments total counter #6 at 204 and sets the reject flag for that container. In any event, the subroutine 173 turns the cameras back on at 205 and then proceeds to the MAIN PROGRAM 121 at 206.

The COMPUTE DATA subroutine 173 can be written to include a computation comparing the difference (LDMAJ-LDMNR) between the largest scanned diameter LDMAJ and the smallest scanned diameter (LDMNR). When that difference (LDMAJ-LDMNR) exceeds a predetermined value, the subroutine 173 increments a total counter #7 (not shown) and sets a reject flag for that container.

When the computer control returns to the MAIN PROGRAM 121 (FIG. 9) which is still looping in the RUN mode between 126 and 133, the total counters comprising counter numbers 1 through 6 are continually displayed until a first frame of data is acquired on the next container, whereupon another NMI interrupt (FIG. 11) will be issued. Also, if any of the reject flags were set at 167, 191, 192, 193, 194 or 204 (FIGS. 11-12), that container will be rejected when the next container is being inspected as described above.

The foregoing disclosure is the best mode devised by the inventor for practicing this invention. It is apparent, however, to one skilled in the pertinent art that various changes may be made in details of construction from those shown in the attached drawings and discussed in conjunction therewith without departing from the spirit and scope of this invention. For example, the lip diameter LD can also be obtained by counting directly the number of dark pixels from the left edge to the right edge of the lip 39 as opposed to counting them indirectly by counting the light pixels to obtain the left and right periphery counts A and B and subtracting them from the total number of pixels TL. The detail in the foregoing disclosure is intended to enable one skilled in the pertinent art to practice the instant invention. Therefore, it is to be understood that this invention is not to be limited to the specific details shown and described.

What we claim is:

1. Apparatus for inspecting the finish of a container comprising:
    means for rotating a container;
    means for illuminating the finish of said container as it rotates to provide an image containing the shadow of said finish;
    means for scanning said image as the container rotates to provide a first series of measurements of outer diameter of said finish;
    means for averaging each said measurement in said first series with at least one preceding measurement in said first series to obtain a second series of average outer diameter measurements;
    first comparing means for comparing each said average outer diameter measurement in said second series with preceding average outer diameter measurements in said second series to identify a minimum outer diameter measurement;
    second comparing means for comparing each said average outer diameter measurement with preceding average diameter measurements in said second series to identify a maximum outer diameter measurement;
    means for comparing each of said minimum and maximum outer diameter measurements with associated preselected minimum and maximum values; and
    means for providing a signal when one of said minimum and maximum outer diameter measurements is not between its associated preselected minimum and maximum values.

2. Apparatus for inspecting the finish of a container comprising:
    means for rotating a container;
    means for illuminating the finish of said container as it rotates to provide an image containing the shadow of said finish;
    camera means positioned to receive said image, said camera means having a field of view with a fixed lineal dimension greater than a predetermined outer diameter of said finish and being so positioned with respect to said illuminating means that said image received at said camera means includes first and second peripheral portions at opposing ends of said shadow;
    means responsive to said camera means to provide a series of outer diameter measurements of said finish as said container rotates, including means for measuring lineal dimension of said peripheral portions to provide first and second periphery measurements, each outer diameter measurement in said series being a function of a difference between said fixed dimension and the sum of said first and second periphery measurements;
    means responsive to each measurement in said series of outer diameter measurements for comparing each said measurement with preceding outer diameter measurements in said series to establish a maximum diameter measurement in said series;
    means for comparing said maximum diameter measurement with preselected maximum and minimum values, and for providing a first signal when said maximum diameter measurement is not between said values; and
    means for determining ovality and eccentricity of said finish comprising first means responsive to each of said first periphery measurements in said series for comparing each said first periphery measurement to preceding first periphery measurements in said series to establish a maximum first periphery measurement in said series, second means responsive to each of said first periphery measurements in said series for comparing each said first periphery measurement with preceding first periphery measurements to establish a minimum first periphery measurement in said series, means for determining a difference between said maximum and minimum first periphery measurements, and means for comparing said difference between said maximum and minimum first periphery measurements with a preselected maximum difference value, and for providing a second signal when said difference exceeds said difference value.

3. The apparatus set forth in claim 2 wherein said means for determining ovality and eccentricity further comprises means for averaging each of said first periphery measurements in said series with at least one preceding first periphery measurements in said series to provide an average first periphery measurement, said first and second means being responsive to said average first periphery measurement.

4. The apparatus set forth in claim 3 further comprising means responsive to said first and second signals for sorting said container.

5. Apparatus for gauging the finish of a container comprising:

means for rotating a container about its axis;

means for illuminating the finish of said container with a beam of light having a dimension lateral to said axis exceeding the maximum diameter of the finish to produce a transmitted beam containing a shadow of the finish;

means for focusing the transmitted beam containing the shadow of the finish to produce an image thereof;

camera means responsive to the focused beam for periodically scanning sequential segments of said image in each of a plurality of successive scans from one periphery of said image to the other periphery in a path generally perpendicular to said axis of the finish as the container rotates, and for providing a number (TL) of pixel signals for each scan, each pixel signal having a magnitude corresponding to the intensity of light sensed at a corresponding segment of said image;

data means responsive to the magnitudes of said pixel signals in each of said scans for counting pixel signals at peripheries of said image on both sides of the shadow of the finish to provide a left periphery count (A) and a right periphery count (B) for each of said scans; and computer means responsive to said periphery counts (A & B) in each said scan for calculating and storing outer diameter (LD) of the finish by summing said periphery counts (A & B) subtracting the sum of said periphery counts (A & B) from the total number (TL) of said pixel signals to obtain a measurement of finish outer diameter (LD), averaging each said outer diameter (LD) with at least one of the diameters (LD) stored during previous scans to obtain and store an average outer diameter $(\overline{LD})$, comparing each said average diameter $(\overline{LD})$ to average diameters obtained and stored during previous scans, identifying the largest scan diameter (LDMAJ) after all of said scans have been completed, and providing a first reject signal if said largest scan diameter (LDMAJ) is not between predetermined first maximum and minimum values, said computer means also being responsive to said comparing means for identifying the smallest scan diameter (LDMNR) after all of said scans have been completed, and for providing a second reject signal if said smallest scan diameter (LDMNR) is not between predetermined second maximum and minimum values.

6. Apparatus for gauging the finish of a container comprising:

means for rotating a container about its axis;

means for illuminating the finish of said container with a beam of light having a dimension lateral to said axis exceeding the maximum diameter of the finish to produce a transmitted beam containing a shadow of the finish;

means for focusing the transmitted beam containing the shadow of the finish to produce an image thereof;

camera means responsive to the focused beam for periodically scanning sequential segments of said image in each of a plurality of successive scans from one periphery of said image to the other periphery in a path generally perpendicular to said axis as the container rotates, and for providing a number (TL) of pixel signals for each scan, each pixel signal having a magnitude corresponding to the intensity of light sensed at a corresponding segment of said image;

data means responsive to the magnitude of said pixel signals in each of said scans for counting pixel signals at peripheries of said image on both sides of the shadow of the finish to provide a left periphery count (A) and a right periphery count (B) for each of said scans; and computer means responsive to said periphery counts (A & B) in each said scan for calculating outer diameter (LD) of the finish by subtracting the sum of said periphery counts (A & B) from the total number (TL) of said pixel signals, comparing said diameter (LD) in each said scan to a maximum diameter (LDMAX) stored during the previous scan, storing the larger of said diameters (LD and LDMAX) for each of said plurality of scans to obtain the largest scan diameter (LDMAJ) after all of said scans have been completed, and providing a first reject signal if said largest scan diameter (LDMAJ) is not between predetermined first maximum and minimum values;

said computer means further comprising means for determining ovality and eccentricity of the finish by comparing in each said scan one of said periphery counts (A) to a maximum of the same periphery count stored during the previous scan, storing the larger of said periphery and maximum periphery counts to obtain a maximum periphery count (Amax) after all of said scans have been completed, comparing the same said periphery count (A) to a minimum of the same periphery count stored during the previous scan and storing the smaller of said periphery and minimum periphery counts to obtain a minimum periphery count (Amin) after all of said scans have been completed, determining a difference (TIRONE) between said maximum periphery count (Amax) and said minimum periphery count (Amin), and then providing a second reject signal if said difference (TIRONE) exceeds a predetermined value (TIRMAX).

7. Apparatus as recited in claim 6 wherein said computer means further includes means for averaging said periphery count (A) in each said scan with at least one periphery count (A) from previous scans to obtain an average periphery count ($\bar{A}$), and means for obtaining said maximum periphery count (Amax) and said minimum periphery count (Amin) as a function of said average periphery count ($\bar{A}$).

8. Apparatus as recited in claim 7 further comprising means for rejecting the container in response to said first and second reject signals.

9. Apparatus for gauging the finish of a container comprising:

means for rotating a container about its axis;

means for illuminating the finish of said container with a beam of light having a dimension lateral to said axis exceeding the maximum diameter of the finish to produce a transmitted beam containing a shadow of the finish;

means for focusing the transmitted beam containing the shadow of the finish to produce an image thereof;

camera means responsive to the focused beam for periodically scanning sequential segments of said image in each of a plurality of successive scans as said container rotates from one periphery of said image to the other periphery of said image in a path generally perpendicular to said axis, and for providing a number (TL) of pixel signals for each scan, each pixel signal having a magnitude corresponding to the intensity of light sensed at a corresponding segment of said image;

data means responsive to the magnitudes of said pixel signals in each of said scans for counting pixel signals in the peripheries of said image on both sides of the shadow of the finish to provide a left periphery count (A) and a right periphery count (B) for each of said scans;

computer means responsive to said periphery counts (A & B) in each said scan for calculating outer diameter (LD) of the finish by subtracting the sum of said periphery counts (A & B) from the total number (TL) of said pixel signals, comparing said diameter (LD) in each said scan to a maximum diameter (LDMAX) stored during the previous scan, storing the larger of said diameters (LD and LDMAX) for each of said plurality of scans to obtain the largest scan diameter (LDMAJ) after all of said scans have been completed, and providing a first reject signal if said largest scan diameter (LDMAJ) is not between predetermined first maximum and minimum values; and a cylindrical lens disposed between said means for focusing said beam and said camera means to magnify the field of view of said camera means in a direction parallel to said axis.

10. Apparatus for gauging the finish of a container comprising:

means for rotating a container about its axis;

means for illuminating the finish of said container with a beam of light having a dimension lateral to said axis exceeding the maximum diameter of the finish to produce a transmitted beam containing a shadow of the finish;

means for focusing the transmitted beam containing the shadow of the finish to produce an image thereof;

camera means responsive to the focused beam for periodically scanning sequential segments of said image in each of a plurality of successive scans from one periphery of said image to the other periphery in a path generally perpendicular to said axis as the container rotates, and for providing a number (TL) of pixel signals for each scan, each pixel signal having a magnitude corresponding to the intensity of light sensed at a corresponding segment of said image;

data means responsive to the magnitudes of said pixel signals in each of said scans for counting pixel signals at peripheries of said image on both sides of the shadow of the finish to provide a left periphery count (A) and a right periphery count (B) for each of said scans; and computer means responsive to said periphery counts (A & B) in each said scan for calculating outer diameter (LD) of the finish by subtracting the sum of said periphery counts (A & B) from the total number (TL) of said pixel signals, comparing said diameter (LD) in each said scan to a maximum diameter (LDMAX) stored during the previous scan, storing the larger of said diameters (LD and LDMAX) for each of said plurality of scans to obtain the largest scan diameter (LDMAJ) after all of said scans have been completed, and providing a first reject signal if said largest scan diameter (LDMAJ) is not between predetermined first maximum and minimum values;

said camera means including means for providing an analog video signal (AV) consisting of said plurality of pixel signals for each said scan, a pulsed clock signal (CLK) for representing the rate at which said pixel signals are provided for each scan, and a video valid signal (VV) representing the beginning and end of each scan;

said data means comprising digitizing means responsive to said analog video signal (AV) for comparing the magnitude thereof to a threshold level (T) and providing a binary video signal (BV) in a first state when the magnitude of said analog video signal (AV) exceeds said threshold level (T) and a second state when the magnitude of said signal (AV) does not exceed said threshold level (T), first periphery means responsive to said video valid signal (VV), said clock signal (CLK) and said binary video signal (BV) to provide said periphery count (A) by counting pulses in said clock signal from a time (t1) when enabled by application of said video valid signal (VV) at a beginning of each of said scans, to a time (t2) when said binary video signal (BV) switches from said first to said second state at one edge of said shadow, and second periphery means responsive to said video valid signal (VV), said clock signal (CLK) and said binary video signal (BV) to provide said periphery count (B) by counting clock pulses from a time (t6) when said binary video signal (BV) switches from said second to said first state at the other edge of said shadow, to a time (t7) corresponding to absence of said video valid signal (VV) at an end of each one of said scans.

11. The apparatus set forth in claim 10 further comprising means for storing maximum amplitude of said analog video signal (AV), and means for selective adjustment of said threshold level (T) to a fraction of said maximum amplitude of said analog video signal (AV).

12. Apparatus as recited in claim 11 further comprising means responsive to said digitizing means for providing a second reject signal when the peak analog video signal (AV) is not between preselected second maximum and minimum values.

13. Apparatus as recited in claim 12 wherein said digitizing means comprises a peak-detect and hold circuit having an input for receiving said analog video signal (AV) and an output, an adjustable resistor connected to the output of said peak-detect and hold circuit, and a comparator having an inverting input connected to said adjustable resistor, a non-inverting input for receiving said analog video signal (AV) and an output for providing said binary video signal (BV).

14. Apparatus as recited in claim 13 wherein said camera means further provides a start-scan signal (SS); and wherein said first periphery means comprises first gating means responsive to said video valid signal (VV), said binary video signal (BV), and said clock signal (CLK) for enabling clock pulses when said video valid signal (VV) is applied at time (t1) and then inhibiting clock pulses when said binary video signal (BV) switches from the first to the second state at time (t2), a first counter having a clock input for receiving enabled clock pulses from said gating means, a reset input for receiving said start scan signal (SS) and an output, whereby said first counter is reset at the beginning of each scan and thereafter tallies clock pulses until said clock pulses are inhibited, and a first latch having a data input connected to the output of said first counter, an enable input responsive to removal of said video valid signal (VV), and an output for providing said periphery count (A) when addressed by said computer means.

15. Apparatus as recited in claim 14 wherein said second periphery means comprises second gating means responsive to said video valid signal (VV) and said clock signal (CLK) for enabling clock pulses when said valid video signal (VV) is applied, a second counter having a clock input for receiving enabled clock pulses from said second gating means, a reset input for receiving said binary video signal (BV) and an output, whereby said second counter resets and begins tallying clock pulses at time (t6) when said binary video signal (BV) switches from said second to said first state, after which said second counter tallies clock pulses until inhibited by said video valid signal (VV), and a second latch having a data input connected to the output of said second counter, an enable input responsive to removal of said video valid signal (VV), and an output for providing said periphery count (B) when addressed by said computer means.

16. Apparatus for gauging the finish and the body of a container comprising:

means for rotating a container about its axis;

means for illuminating the finish and body of said container to provide a finish image having preselected first dimension lateral to said axis which contains a shadow of the finish and a body image having preselected second dimension lateral to said axis which contains a shadow of the body, the said dimensions of said finish and body images being such that said finish and body images include finish and body peripheries uncovered by said shadows at opposing ends of said dimensions;

means for scanning said finish image from one periphery to the other periphery and said body image from one periphery to the other periphery as the container rotates to provide a series of scans each containing measurements of said finish peripheries (A and B) and said body peripheries (C and D);

computer means responsive to said periphery measurements for calculating outer diameter (LD) of said finish based upon a difference between said first dimension of said finish image and the sum of said finish peripheries (A and B), averaging said finish diameter (LD) at each said scan with at least one finish diameter obtained during preceding scans to obtain an average finish diameter ($\overline{LD}$), calculating outer diameter (BD) of said body based upon a difference between said second dimension of said body image and the sum of said body peripheries (C and D), setting a maximum scan diameter equal to said average diameter ($\overline{LD}$) for each scan if said average diameter ($\overline{LD}$) is greater than said maximum scan diameter to ultimately obtain a largest scan diameter (LDMAJ) after all of said scans have been completed, and providing a first reject signal if said largest scan diameter (LDMAJ) is not between predetermined first maximum and minimum values.

17. Apparatus as recited in claim 16 wherein said computer means also sets a minimum scan diameter equal to said average diameter ($\overline{LD}$) for each scan if said average diameter ($\overline{LD}$) is less than said minimum scan diameter to ultimately obtain the smallest scan diameter (LDMNR) after all of said scans have been completed, and provides a second reject signal if said smallest scan diameter (LDMNR) is not between predetermined second maximum and minimum values.

18. Apparatus as recited in claim 17 wherein said computer means measures ovality (OV) of the finish for each scan according to the equation:

$$OV = M(C + BD/2) - A + AO$$

where OV is equal to measured ovality, M is equal to a difference between said first and second dimensions, and AO is equal to offset between edges of said finish image and said body image in a direction parallel to said dimensions, and wherein said computer means sets a maximum ovality equal to said measured ovality (OV) for each scan if said measured ovality (OV) is greater than said maximum ovality to obtain a maximum measured ovality (OVmax) after all of said scans have been completed, sets a minimum ovality equal to said measured ovality (OV) for each scan if said measured ovality (OV) is less than said minimum ovality to obtain a minimum measured ovality (OVmin) after all of said scans have been completed, determines a difference (TIRTWO) between said maximum measured ovality (OVmax) and said minimum measured ovality (OVmin), and provides a third reject signal if said difference (TIRTWO) exceeds a predetermined third value (TIRMAX).

19. Apparatus as recited in claim 18 wherein said computer means averages said measured ovality (OV) with at least one ovality measured during previous scans to obtain an average measured ovality ($\overline{OV}$), and employs said average measured ovality ($\overline{OV}$) to set said maximum and minimum ovalities.

20. Apparatus as recited in claim 16 wherein said computer means measures eccentricity (CO) of the finish for each scan according to the equation:

$$CO = M(C + BD/2) - (A + LD/2) + AO$$

where CO is measured eccentricity, M is equal to a difference between said first and second dimensions, and AO is equal to offset between edges of said finish image and said body image in a direction parallel to said dimensions, and
   wherein said computer means sets a maximum eccentricity equal to said measured eccentricity (CO) for each scan if said measured eccentricity (CO) is greater than said maximum eccentricity to obtain a maximum measured eccentricity (COmax) after all of said scans have been completed, sets a minimum eccentricity equal to said measured eccentricity (CO) for each scan if said measured eccentricity (CO) is less than said minimum eccentricity to obtain a minimum measured eccentricity (COmin) after all of said scans have been completed, determines a difference (OFFSET) between half of said maximum measured eccentricity (COmax) and half of said minimum measured eccentricity (COmin), and provides a fourth reject signal if said difference (OFFSET) exceeds a predetermined fourth value (OFFMAX).

21. Apparatus as recited in claim 20 wherein said computer means averages said measured eccentricity (CO) with at least one eccentricity measured during previous scans to obtain an average measured eccentricity ($\overline{CO}$), and employs said average measured eccentricity ($\overline{CO}$) to set said maximum and minimum eccentricities.

22. A method for gauging the finish of a container comprising the steps of:
   rotating a container about its axis;
   illuminating the container finish to provide an image of predetermined length laterally of said axis containing a shadow of the finish;
   scanning the image as the container rotates to provide a measurement of outer diameter (LD) of the finish for each scan;
   averaging the measured outer diameter (LD) with at least one measured outer diameter provided during previous scans to obtain the average measured outer diameter ($\overline{LD}$),
   setting a maximum scan diameter equal to the average measured outer diameter ($\overline{LD}$) for each scan if the average diameter ($\overline{LD}$) is greater than the maximum scan diameter set during previous scans to obtain a largest scan diameter (LDMAJ) after all scans have been completed; and
   providing a first reject signal if the largest scanned diameter (LDMAJ) is not between predetermined first maximum and minimum values.

23. A method as recited in claim 22 further comprising the steps of setting a minimum scan diameter equal to the average diameter ($\overline{LD}$) for each scan if the average diameter ($\overline{LD}$) is less than the minimum scan diameter set during previous scans to obtain a smallest scan diameter (LDMNR) after all scans have been completed, and providing a second reject signal if the smallest scan diameter (LDMNR) is not between predetermined second maximum and minimum values.

24. A method as recited in claim 23 wherein said scanning step indirectly provides said measured outer diameter (LD) by scanning said image lateral to said axis to provide periphery measurements (A and B) indicative of peripheral portions of said image not covered by said shadow and calculating said outer diameter (LD) by subtracting the sum of said periphery measurements (A and B) from the length of the image.

25. A method as recited in claim 24 further comprising the steps of setting a maximum periphery measurement equal to one periphery measurement (A) for each scan if said one periphery measurement (A) is greater than a previous maximum periphery measurement for previous scans to obtain the maximum periphery measurement (Amax) after all scans have been completed, setting a minimum periphery measurement equal to said one periphery measurement (A) for each scan if said one periphery measurement (A) is less than a previous minimum periphery measurement for previous scans to obtain a minimum periphery count (Amin) after all scans have been completed, determining a difference (TIRONE) between the maximum periphery measurement (Amax) and the minimum periphery measurement (Amin), and providing a third reject signal if said difference (TIRONE) exceeds a predetermined third value (TIRMAX).

26. The method set forth in claim 25 for inspecting the finish and body of the container comprising the additional steps of:
   illuminating the body of the container to provide a second image of predetermined length lateral to said axis containing the shadow of the body,
   scanning the body image as the container rotates to provide periphery measurements (C and D) indicative of peripheral portions of said second image not covered by said body shadow, and
   calculating outer diameter (BD) of the body by subtracting the sum of the body peripheries (C and D) from said length of the body image.

27. A method as recited in claim 26 further comprising the steps of calculating ovality (OV) of the finish for each scan according to the equation:

$$OV = M(C + BD/2) - A + AO,$$

where OV is calculated ovality, M is equal difference between said predetermined lengths of the finish image and the body image, and AO is equal to an offset between edges of said finish and body images,
   setting a maximum ovality equal to the calculated ovality (OV) for each scan if the calculated ovality (OV) is greater than the maximum ovality for previous scans to obtain a largest calculated ovality (OVmax) after all the scans have been completed,
   setting a minimum ovality equal to the calculated ovality (OV) for each scan if the calculated ovality (OV) is less than the minimum ovality for previous scans to obtain a smallest calculated ovality (OVmin) after all the scans have been completed; and
   providing a fourth reject signal if the difference (TIRTWO) between the largest calculated ovality (OVmax) and the smallest calculated ovality (OVmin) exceeds a predetermined fourth value (TIRMAX).

28. A method as recited in claim 27 further comprising the steps of computing eccentricity (CO) of the finish for each scan according to the equation $$CO = M(C + BD/2) - (A + LD/2) + AO,$$

where CO is computed eccentricity, setting a maximum eccentricity equal to computed eccentricity (CO) for each scan if the computed eccentricity (CO) is greater than the maximum eccentricity for previous scans to obtain a largest computed eccentricity (COmax) after all of the scans have been completed, setting a minimum eccentricity equal to computed eccentricity (CO) for each scan if the computed eccentricity (CO) is less than the minimum eccentricity for previous scans to obtain a smallest eccentricity (COmin) after all of the scans have been completed, and providing a fifth reject signal if the difference (OFFSET) between half of the largest computed eccentricity (COmax) and half of the smallest computed eccentricity (COmin) exceeds a predetermined fifth value (OFFMAX).

* * * * *